(12) United States Patent
Chadwick (10) Patent No.: US 6,853,952 B2
(45) Date of Patent: Feb. 8, 2005

(54) METHOD AND SYSTEMS OF ENHANCING THE EFFECTIVENESS AND SUCCESS OF RESEARCH AND DEVELOPMENT

(75) Inventor: Andrew Thomas Chadwick, Nottinghamshire (GB)

(73) Assignee: PA Knowledge Limited, Georgetown (KY)

( * ) Notice: Subject to any disclaimer, the term of this patent is extended or adjusted under 35 U.S.C. 154(b) by 0 days.

(21) Appl. No.: 10/438,252

(22) Filed: May 13, 2003

(65) Prior Publication Data

US 2004/0230397 A1 Nov. 18, 2004

(51) Int. Cl.[7] .......................... G06F 19/00; G01N 33/48
(52) U.S. Cl. ..................................................... 702/181
(58) Field of Search .......................... 702/181, 27, 19; 436/518, 524; 435/174, 175

(56) References Cited

FOREIGN PATENT DOCUMENTS

| WO | WO 99/15894 | 4/1999 |
|---|---|---|
| WO | WO 99/23587 | 5/1999 |
| WO | WO 03/042898 | 5/2003 |

OTHER PUBLICATIONS

Blau et al., "Risk Management in the Development of New Products in Highly Regulated Industries," *Computers and Chemical Engineering*, 24:659–664 (2000).

Gittens, John, CPS/CAI, An Introduction, pp. 1–25, Sep. 15, 1999.

Gittens, John, "Quantitative Methods in the Planning of Pharmaceutical Research," *Drug Information Journal*, 30:479–487 (1996).

Tong et al., "Active Learning for Structure in Bayesian Networks,".

Cast Communications, The Semi–Annual Publication of the Computers and Systems Technology Division of AIChE, vol. 20(2) Summer 1997 Editor Peter R. Rony.

*Primary Examiner*—Kamini Shah
(74) *Attorney, Agent, or Firm*—Carol M. LaSalle; Bozicevic, Field & Francis LLP (57) ABSTRACT

Methods of doing business and systems for implementing those methods which improve the effectiveness and success of the research and development of technology such as pharmaceuticals, biotechnology, agrochemicals, medical technology, and genomics. The methods include the application of value and cost modeling methodologies to provide a pharmaceutical, biotechnology or genomics research and development organization with information and data which will assist it in making choices and decisions about its prospective products and the manner of research and development thereof in order to realize the greatest economic gain from commercialization of the products.

35 Claims, 2 Drawing Sheets

Key Roles in Research and Development

| Task | Strategic Planning | Process Implementation | Technology Evaluation and Change Initiative |
|---|---|---|---|
| (1) Set goals and analyse risks and tradeoffs | (a) Assess risks and tradeoffs between quality and quantity of research output for product candidate and define pass/fail criteria for the options passing from research to development, and from development to sales | (d) Decide on the parallel tests to be employed, balancing resource utilization against the advantages of speed and of combining (weighting) multiple numerical results | (g) Consider investment in a new technology or application to improve the R&D process over a number of scientific projects |
| (2) Plan and execute the process | (b) Identify potential bottlenecks and balance between resource allocation and product attrition | (e) Choose the threshold level for each test taking into account predictive reliability, the impact of false positives and false negatives, and project-specific factors | (h) Recommend conditions for using new technology to investigate options for treatment of a particular disease, or for use on a particular project or at a particular site, taking into consideration the potential impact on bottlenecks and the success of product candidate |
| (3) Review outcomes and plan improvements | (c) Review successes and failures of previous company projects and identify causes of each and the extent to which these could have been prevented by improvements in the R&D process | (f) Assimilate current project findings into prior company and industry findings, and refine scientific theories if necessary | (i) Evaluate the robustness of the current plans for change and improvement, considering sensitivity to assumptions; identify needs for new information |

ME THOD AND SYSTEMS OF ENHANCING
THE EFFECTIVENESS AND SUCCESS OF
RESEARCH AND DEVELOPMENT

FIELD OF THE INVENTION

This invention relates generally to methods of doing business and systems for implementing those methods which improve the effectiveness and success of the research and development (R&D) of technology such as pharmaceuticals, biotechnology, agrochemicals, medical technology, and genomics. More particularly, the inventive methods include the application of value and cost modeling methodologies to provide a research and development organization with information and data which will assist it in making choices and decisions about its prospective products and the manner of research and development thereof in order to realize the greatest economic gain from commercialization of the products.

BACKGROUND OF THE INVENTION

The identification of effective and safe pharmaceutical, medical, agrochemical, biotech and genomics technologies is of great commercial and human importance. Currently, many potential medical innovations and pharmaceutical compounds which progress into the development phase are determined to be unsuitable for viable commercial use, being ineffective or inactive in humans or otherwise determined to be unsafe. The average cost of a new drug approval is between $360 and $600 million for each successful launch and requires from about 12 to 15 years to achieve. See Pharma Exec., January 2000, Windhover Information Prentis Grabowski, 1994 Journal of Health Economics, Vol. 13. Considering that only 3 in 10 drugs achieve revenues greater than their development costs, id, the unsuccessful selection of prospective drug products is extremely costly to the manufacturer, and ultimately to the insurer as well as to the consumer. It is thus an ongoing objective of the medical, biotechnology and pharmaceutical industries to find effective ways of reducing this high attrition rate.

There are many commercially available tools that utilize predictive models to eliminate unsuccessful products, such as drug compounds or the like, before substantial time and money are invested in research and development. One such model is used to predict adsorption, distribution, metabolism and excretion (ADME) properties and toxicology profiles of a drug compound. Once determined, a predictive ADME or ADME/tox model is useful for deciding on the particular courses of action to be taken in subsequent stages of the drug's development on the premise that drug candidates having superior ADME properties have a greater likelihood of clinical success. Examples of predictive ADME/tox tools are the BioPrint™ products distributed by Cerep, Inc., the VolSurf™ model by Tripos, iDEA™ from LION Bioscience AG and the QikProp™ software by Schrodinger, Inc.

While predictive models are helpful in determining clinically sound drug candidates, they only provide part of the overall picture. In particular there is a need to plan research work so as to best balance scientific and commercial/cost considerations. Such "business" related factors include the manner in which research operations are conducted, including determining the number of targets to be researched at any one time, which tests to apply to compounds that may become active ingredients in product candidates, the sequence in which to apply these tests, the criteria to apply when progressing compounds from one stage of research and development to the next, and whether certain compounds should be developed in parallel or serially with respect to each other. Another group of factors not considered by predictive scientific property models includes those dependent upon an organization's resource capacity and constraints, e.g., the scope and number of scientific personnel needed, the amount of lab space and equipment required, and the costs associated with each of these.

Other business considerations that are pivotal in ensuring a drug's ultimate commercial viability are the potential demand for treatment of a particular disease or condition, the available market size and competitors' activities related to treatment of the same condition or disease state to which the subject drug is targeted. The attractiveness of a drug, and hence the available market share, will depend on factors such as the frequency of dosing that are originally determined by the chemical nature of the compound chosen for development of an active ingredient, but cannot be directly measured in the early stages of research. Factors of this nature have to be projected from the emerging results of testing during the R&D process, and the planned tests may be modified in accordance with findings, possibly including the decision to work on a different active ingredient.

It is necessary to consider all of these business factors in combination with scientific factors to insure favorable risk-to-benefit and cost-to-profit ratios in the projects that discover, develop and commercialize a drug or other medical or biotechnology product. The fundamental problem is to capture and correctly apply an understanding of how early scientific measures of quality of a potential drug relate to economic measures of quality, i.e., sales performance and profitability, in the market.

A number of business modeling approaches exist to assist management in making the right decisions and best choices to increase the likelihood of the commercial success of a drug; however, they are not without their shortcomings. Two well-known business modeling approaches used in the pharmaceutical industry are throughput modeling and discrete event simulation.

Throughput modeling looks at how many compounds, leads and development candidates are expected to pass each stage, while discrete event simulation models the detail of tasks, sequence, time and contention for resources. A throughput model used in isolation is lacking in that it fails to assess how various decision criteria affect the quality of a drug compound and the yields that would be achieved in the later stages of testing.

The discrete event simulation approach is able to deal with fluctuations in work over time, which may be important in the later stages of R&D. See "A Systems Engineering Approach to New Product Development", Gary Blau, CAST Communications, Vol. 20 No. 1, Summer 1997, pp 4–11. It is rare for such models, if applied to earlier stages of R&D, to represent in any depth the differences between individual examples of compounds or other research options, as these do not appear important from the viewpoint of scheduling a process such as screening as a materials handling operation. However, in reality, there are various dimensions of quality important in evaluating the potential commercial success of each of the many molecules that may need to be made and screened before identifying a development candidate, including, for example, activity, safety, transport properties and novelty. The presence or absence of these factors influences the value of the product and the cost and risk of downstream work. For example, molecules that show a lack of selectivity are less valuable as products, and also more likely to fail clinical trials, and lead series that enumerate only a small part of the variety of active chemical structures are more likely to lead to lost sales due to early launch by competitors of equally, or more, attractive products. In the reference cited above, many of these kinds of difference between options were combined into a single "degree of difficulty" affecting the time taken to work on a particular project. In a subsequent development of this approach, the sequence of decisions in drug development was combined with a representation of subjective success probabilities for different projects at different stages; however, it was acknowledged that the complexity and creativity inherent to the discovery process makes it difficult to capture all the activities in the discovery process. See "Risk Management in the Development of New Products in Highly Regulated Industries", Blau et al., Computers and Chemical Engineering, Vol. 24, pp. 659–664 (2000).

Where a decision making process involves the impact of a single criterion or variable on the potential success of a product, combining cost and value parameters in a simple trade-off equation (cost-benefit analysis) provides reliable insights. However, such is not the case with multiple-attribute decision-making. While decision support methods do exist for analyzing multiple decision criteria, they are, too, not without shortcomings. In multi-attribute decision systems, the overall user preference or "utility" for an option is determined in terms of values of various attributes of the option and the preferences of the user towards each of those attributes (i.e., the importance of those attributes). A preference function combining these attributes and their values characterizes the structure of the preference model. See Keeney, R., Raiffa, H., *Decisions with Multiple Objectives: Preferences and Value Trade-Offs*, John Wiley and Sons, 1976. An alternative approach, conjoint analysis, has been used widely in market research to identify the factors that contribute to consumer preference, through a process of consumer research and data fitting (see www.populus.com/techpapers/conjoint.pdf). A drawback of both these methods, when applied to choice of research methods and research options, is the subjective nature of elicited human judgments on the utility of technical and scientific measurements, which may not be objectively based on business and economic metrics. For example, a scientist may, unwittingly, heavily weight a factor in the drug selection decision of which they have good knowledge (e.g., it is relevant to their scientific specialty) even if, objectively, such a factor is likely to make only a small contribution to value. Even the seemingly objective goal for a method of "accuracy" is misleading since shortfalls in predictive reliability have two components, false positives and false negatives, and the relative importance of these depends on the consequences of each, which in turn depends on the costs and value of downstream activities.

In order to successfully model the entirety of the R&D process with the aim of guiding its improvement, it is necessary to track the multiple sources of potential failure for each of the many research options, e.g., the screening of hundreds of thousands of compounds, through sequential stages of R&D where multiple criteria are used to select compounds, and where new research options are added through business processes such as lead optimization. The successful modeling of the full R&D process, in a way that takes account of uncertainty, the variety of research options, capacity constraints, and can incorporate new findings, has been an unsolved challenge.

Accordingly, there is still a need for comprehensive methods of improving the effectiveness of technology and scientific research in order to maximize the economic value of products that come out of such research, taking account of the operating costs and capacity of research. More particularly, there is a need for methods which take into consideration both scientific and business factors in the context of a research and development process having multiple measurable sources of variety (including the differing measures for screening results and also both descriptors and calculated values for structure and properties of compounds, series, targets and assays) and criteria (variables used as the basis for decision making) which are applied in sequence. While explicit probability distributions may be used with these approaches to model variation within such factors and correlations between them all, a large amount of data is required, which would be prohibitive if all possible combinations were included in the model. Methods are therefore required that can efficiently capture the essential results from compound screening and biological target evaluation in a way suitable for use in guiding subsequent decisions. It would be additionally advantageous if such methods provided for adaptive learning in which certain estimates of relationships between these variables, including variables usable as criteria, are adjusted or re-weighted in response to scientific and business outcomes, thereby refining the processes of product selection, research and development. Finally, to minimize user subjectivity, such methods should preferably relate scientific measures to business and economic outcomes using economic value as the common figure of merit.

SUMMARY OF THE INVENTION

The present invention provides new methods of doing business and systems for implementing these methods for assisting an R&D organization in making choices and decisions about its prospective products and the research and development thereof. The subject methods facilitate the effective compilation and synthesis of certain information and data available to the R&D organization. The R&D organization can subsequently use the compiled and synthesized information and data to realize the greatest overall economic gain from further research, development and commercialization of the products, and can better judge what additional information would best guide improved processes and research methods in the future.

An important aspect of the invention is the consideration of both scientific and business-related factors, and the relationships of cause and effect between them, in making decisions and choices at the various stages in the research and development process. More specifically, in one variation, the invention comprises a method of doing business comprising at least the following: (a) compiling scientific and business data regarding product or development candidates and R&D capacity, resources and flow; (b) applying a combination of value and cost modeling methodologies to data; (c) creating, from data, prior knowledge, experience and structured experiment, a model in the form of a probabilistic network that contains conditional probability relationships, using scientific and commercial measures and estimates of quality, between the envisaged product and the research options within the R&D process that are precursors to this product (e.g., a target, lead and lead series, and development candidate); and (d) making decisions and choices regarding research and development processes based on results of methodology application of (b) and (c) and the use of sums or integrals over the probabilities of contiguous states, within variables represented in the network that are affected by changes in criteria, to estimate, for varying thresholds on selection and enumeration criteria, fractional changes to flow and therefore, through cumulation of such changes over successive stages of work, impacts on the expected rate of issuing candidates and on capacity use, together with quality distributions and hence candidate value projected from the selected thresholds using the probabilistic network. The decision-making process of (d) may further comprise refining the data compilation of (a) and the methodology application of (b) and (c). A goal of the invention is to commercialize highly successful and profitable products based on highly efficient research and development processes. The steps of the method may be carried out by the same entity or by several entities all on behalf of the entity researching, developing and/or eventually commercializing the product.

The inventive methods may include a combination of various techniques and methodologies which can be applied at various stages of the research and development process to generate information which can then be used to make various decisions at any stage of research and development, including the planning, implementation, outcome review and improvement of research tasks and methods. Examples of such techniques and methodologies include conventional decision analysis (e.g., decision trees), expert systems, statistics, neural networks, belief networks (ie., Bayesian networks), steady-state modeling, optimization methods (e.g., gradient descent, maximizing value within constraints), economic theories (e.g., marginal cost formulations), etc.

In one variation of the present invention, the subject methods involve the application of both value and cost modeling methodologies. A user of the methods determines the projected market value of a product and the relationship between such value and the attributes of product quality (typically, activity, safety margin, selectivity, toxicity, dose frequency, dose form, novelty, ease of manufacture, etc.), also referred to as a "quality profile," using a probabilistic network or other means for learning of complex relationships, including statistical analysis (e.g., multiple regression). Such measures of product quality may also be applied for the comparison of product candidates or development candidates, as "candidate quality attributes". Expert judgments may also be incorporated where necessary. At the same time, the likelihood of failure at different stages of development, where each successive stage is undertaken only for candidates passing the criteria applied in all previous stages, may be estimated and combined with the cost, or in general, resource use, of each development stage, to determine an expected, averaged cost of development and the chance of reaching market, using methods such as decision trees, influence diagrams or a belief network. For each value that could be taken by the candidate quality attributes, the subject methods then provide an estimate of value-added and prospective risk. A probabilistic network is then formed to represent the chain of cause and effect between the various candidate quality attributes, severally or jointly, where that chain represents the reliability of estimates of candidate quality made directly or indirectly in the form of measures on research options during the various stages of research, where those measures may also be useful as criteria for selection or enumeration processes during research, such that the total model, including this probabilistic network, together with the aforementioned model of the relationship between quality attributes of the candidate and business outcomes, permits the calculation of impact of changes in the way that decisions are made during the research and development process. The subject methods then allow the user to assess how the manner in which research operations are conducted is likely to impact business outcomes, according to the effects of changed research decisions on the quality profile of the development candidates.

Assuming that the research tasks such as making and testing individual compounds, and also, for some purposes, the handling of batches of compounds, can be approximated as a continuum (i.e., the precise timing relationships can be neglected), then the subject methods provide insight into the potential constraints on capacities and bottlenecks in the process flow thereby enabling the user to make strategic choices and decisions about the research and development of a product that will minimize the costs of such research and development and at the same time maximize the net value of the resulting development options created in unit time (i.e., the volume of output of development candidates in unit time times the expected value for such a candidate, where the volume is flow times time). In this continuum approximation, the capacity at each stage is assumed to be shared amongst multiple projects, although the needs for capacity may differ (e.g., on in any one laboratory an assay in one project may consistently require more time than in a second project).

The subject methods provide insight into the potential constraints on capacities and bottlenecks in the process flow thereby enabling the user to make strategic choices and decisions about the research and development of a product that will minimize the costs of such development and at the same time maximize the net value of the resulting development options (the volume times the expected value). It may be convenient to assume that the continuum model is a model of a steady-state system, for example by averaging over a sufficient number of projects. Alternatively, the flow may be considered to vary over time, but still averaging the work over more than one task. The amount of work to be done at a stage or within a set of tasks may also be divided by the flow, to estimate how long, on average, the work is likely to take. It is also possible to consider the best choices for a single project, taking into account any special product or scientific requirements in that project, by taking the total capacity available and reducing it by the expected demand on resource from other concurrent projects. Where information is available about such characteristics for a whole set of projects within a portfolio then predictions and decisions can be made for the whole portfolio, weighting the projects by the number of tasks, resources used for each task, and using the project-specific estimates of probabilities of success at different stages of R&D in the different projects.

With the subject methods, it is also possible to inform the best choices for a single project, taking into account any special product or scientific requirements in that project and the total capacity available and reducing it by the expected demand on resource from other concurrent projects. Where information is available about such characteristics for a whole set of projects within a company's portfolio, then predictions and decisions can be made for the whole portfolio, weighting the projects by the number of tasks, resources used for each task, and using the project-specific estimates of probabilities of success at different stages of R&D in the different projects.

The systems of the present invention include a computer readable medium carrying one or more software programs each having one or more sequences of instructions for carrying out the method steps of the present invention. The software program may include means for receiving one or more sequences of instructions from a user of a computer system for initiating operation of such software program and for providing various parameters for performing the method steps.

Information obtained by the present invention is used to enhance the process by which compounds such as drugs are selected as development candidates, and developed up to the point of regulatory approval and sales. By enhancing the efficiency of these R&D processes the efficiency of the overall method of doing business is enhanced. The present invention endeavors to decrease research and developmental costs relative to the value of the products that emerge from R&D, thereby increasing profits. The methodologies and systems of the invention may possess the advantage of being an interactive, comprehensive and outcome-responsive tool for the pharmaceutical and biotechnology industries.

These and other objects, advantages, and features of the invention will become apparent to those persons skilled in the art upon reading the details of the invention as more fully described below.

BRIEF DESCRIPTION OF THE DRAWINGS

FIG. 1 is a chart illustrating the types of tasks performed by the various personnel roles involved in the R&D process, and the reiterative or learning aspect of the methods of the present invention as applied to the R&D decision-making process.

DEFINITIONS

Unless defined otherwise, all technical and scientific terms used herein have the same meaning as commonly understood by one of ordinary skill in the art to which this invention belongs. Still, certain elements are defined below for the sake of clarity and ease of reference.

A "bottleneck," as used herein, is a stage within a process in which queues are consistently observed as a result of contention between tasks for limited resource or fixed assets (i.e., there is a critical limitation on capacity).

A "candidate", as used herein, is used interchangeably with development candidate and product candidate, in either case, a potential product for which further development is required to establish viability or safety.

"Capacity," as used herein, is the maximum rate of work (i.e., the number of tasks in unit time) that can be performed given a set level of resource(s) available for performance of each task that may optionally be shared between tasks that are performed in parallel, or more widely between tasks at different stages of research that are occurring concurrently within differing projects. The availability of capacity may depend on the timescale of analysis. With sufficient planning and expenditure, new capacity can be obtained. "Effective capacity" may be less than theoretical capacity where there are a number of different types of work (e.g., different scientific assays) which can all be performed on the same equipment or in the some facility or by the same specialists, as effective capacity accounts for the time taken to switch between one type of work and another (e.g., clean-down, set-up and calibration activities). Effective capacity may therefore depend on the variety of work and the way it is scheduled; frequent switching between types of work (e.g., different assays for different projects within an high through-put screening facility), or a fluctuating flow of work, will reduce effective capacity, as defined here relative to the average flow of work, as would a pattern of research conduct comprising the execution of only a few projects at any one site where the stages within those projects are lengthy and strictly sequential, and resources at that site are not sufficient for all projects to execute the same stage in parallel, so that work in one project at a given stage would be likely to be significantly delayed by a different project working at the same stage.

"Criterion" is a measure used in selection processes or the direction of change in enumeration of research options.

"Cumulative selection", as used herein, means that there is more than one selection step over the time sequence modeled and that the ratios of flow, determined in each selection step, are multiplied together to determine the overall impact of cumulative selection on the flow.

"Decision boundary", as used herein, means the condition of a criterion required for a change in a course of action.

"Direction of enhancement", as used here in the context of an enumeration, means the feature (or characteristic) or combined features (or characteristics) of a research option that are used as measures when deciding which further research options to include in an enumeration. For example, there may be a chemical compound ("lead") that has promising properties and a lead series is to be developed that consists of further compounds with some similarities and some differences relative to the lead; then a direction of change may, for example, be defined as adding functional groups in one or more locations of varying size (e.g., methyl, ethyl, propyl, butyl), or varying atomic weight (e.g., fluoro-, chloro-, bromo- iodo-) or varying electronegativity, or varying charge, or varying strength of hydrogen bond acceptance or donation, or many other such changes that can be ranked in some predetermined way, as known to medicinal chemists. A variable used in Quantitative Structure-Activity Relationships (QSAR) could be such a direction of change. A direction of change may also be determined over ensemble properties of the research option such as size, number of rotatable bonds, selectivity, prevalence (for example, of receptors, enzymes or metabolic pathways) within one or more population groups, and also where those properties are financial or economic in nature, or are frequencies of occurrence, such as the number of medicinal patents in which a particular chemical or biochemical feature occurs or where they are estimated likelihoods, such as the chance of competition.

"Enumeration", as used herein, is the addition of further research options of the same kind as an existing research option. Selection may be combined with an enumeration process as follows: a direction of change is determined, many possible new research options, including an infinite number of new research options, are then within the range of consideration, and specific research options, or research options within a finite range on one or more measures, are selected for practical evaluation.

A "false negative," as used herein, is a result from a test that indicates that a research option is of low quality, when in fact, or according to a different test deemed more reliable, that research option is of high quality on the criterion being considered (e.g., compound activity as a drug against a given biological target). This kind of error in a prediction may, if used in the decision-making process, wrongly eliminate research options that could have generated net value. The rate of false negatives as a fraction is (1-sensitivity) for a test that measures a characteristic of positive quality (e.g., activity) and (1-specificity) for a test that measures a characteristic of negative quality (e.g., toxicity).

A "false positive," as used herein, is a result from a test that indicates that a research option is of high quality, when in fact, or according to a different test deemed more reliable, that research option is of low quality on the criterion being considered (e.g., compound activity as a drug against a given biological target). This kind of error in a prediction, if used in the decision-making process, leads to unnecessary costs and/or allocation of fixed resource capacity in the investigation of research options that do not have a genuine potential to generate net value. The rate of false positives as a fraction is (1-specificity) for a test that measures a characteristic of positive quality (e.g., activity) and (1-sensitivity) for a test that measures a characteristic of negative quality (e.g., toxicity).

The term "flow," as used here, is the average amount of work (number of tasks) being completed in unit time. The units of flow depend on the nature of the task. In research, this is typically the number of compounds screened in unit time. Flow is measured in the same units as capacity and the ratio of flow to capacity is the "loading" on capacity. The detailed measure of capacity and flow will change from stage to stage of research according to whether individual compounds or series of compounds are being considered, and therefore our model includes conversion factors to be supplied by the user such as the number of chemical compounds made and tested during a campaign of high-throughput screening. Flow is also influenced by the use of multiple cycles of work, each of a given batch size, in work such as lead optimization. For example, if in a project there are expected to be 6 cycles within the stage of lead optimization with each making and then evaluating a batch of 50 compounds, and if an organization handles 5 such projects in a year, then the flow of compounds to be made and evaluated at this stage is 1500 (6×50×5) compounds per year.

As used herein, the term "modeling" means an abstract representation of reality. Models allow a user to explore the likely consequences of alternatives and guide them towards a course of action that helps to meet their objectives. For example, in the analysis of a portfolio of drug development projects, the details of expected timing of work are important to a realistic model, as costs of payment to external organizations for clinical trails are high, and the work on an individual project is very peaky over time. However, to represent the earlier stages of R&D it can be sufficient to make the assumption that as one project finishes, use of a given resource will switch to another project, so that work is approximated as a continuum, or further, as a continuous flow. This allows the model user to look at the best way to operate R&D across a set of projects.

As used herein, "an ordered classification", also abbreviated as "an ordering" is the result of application of one or more measures to research options such that they are ranked in preference. That preference may then be used to influence the future conduct of the research, for example by selection only of some options for further investigation at any one time. The choice of research options may be within either a selection or an enumeration process. The scale used may be continuous or discontinuous (discrete). In the case where the invention uses a belief net as the probabilistic network (defined below), a continuous scale is discretized at equal or unequal intervals, including possibly transformations of the measure (such as taking logarithms). Where unequal intervals are used these are best chosen so that the intervals are more closely spaced around values important to the user when considering alternative decision thresholds, allowing for selections that are likely already to have been made. For example, a model of hit confirmation will preferentially sample properties for hits not for all molecules originally screened. An ordered classification may include a classification using multiple measures where those measures are numerically combined in a linear or nonlinear coordinate transformation, in which case each of the new coordinates is available as a potential measure for ordering, and classification may use several or all of these measures. In a preferred embodiment, each of these transformed coordinates is presented to the user as a separate choice, where later choices are made conditional on the selections made.

As used herein, "quality" when applied to a "product" refers to that product's fitness for a particular purpose, wherein a product may be an artifact, e.g., an active ingredient (compound), of a final product, e.g., a drug formulation. Quality is preferably defined over a number of attributes that may be partially interdependent. The final quality of a drug, for example, is measurable in terms relevant to patient treatment, sales value and cost of production, such as the therapeutic margin (therapeutic index) in humans, safety, convenience of dosing, stability and complexity of manufacture of the formulation. A drug of higher quality will have a higher expected net present value taking into account sales, profit and loss over a range of possible futures. At an earlier stage of research, these attributes of drug quality may not directly measurable, as evidence is available only from calculations based on chemical structure, or from physicochemical measurements, in-vitro and in-vivo (animal) tests, bioinformatics, proteomics and genomics. Empirical results and scientific theories often indicate a causal relationship between research findings on a compound and its quality if developed as a drug. For example, if a compound is detected as a mutagen for a bacterium in an AMES test, it is likely to be carcinogenic if given to humans. A compound that binds only weakly to a biological target, such as an enzyme or receptor, in a high-throughput assay, will not turn out to be an active drug where this target is part of the necessary mechanism for intervention in the disease. Therefore, the definition of "quality" with respect to early-stage research is the calculated or measured values for compounds, targets and chemical series which tend to correlate with later drug quality. These values can be for an individual compound, for a series of compounds with some common descriptor, or for the biological target (e.g., the percentage of potential patients in which an drug intervention based on this target will significantly reduce disease symptoms, or effect a total cure). Such values may typically be used as criteria for selection or enumeration during the research process. The term quality may also be used to describe the reliability of an assay, which is a test for the interaction between a compound and a sample of a target, and by extension may also be used to describe the fitness for purpose within research of use of an animal, organ, cellular or other physical research model or technical mechanism upon which such an assay relies.

As used here, a "probabilistic network" is a belief net, neural network, system of logic or other means for the representation of conditional probabilities in which a change of assumption or findings about one variable may be rapidly propagated to determine and report the probabilities of other variables. Where algorithms are known to those versed in the art of statistics, or artificial intelligence, such that the conditional probabilities and/or structure of a probabilistic network may be estimated from individual examples of findings, without the need for explicit knowledge of probabilities, then this is termed here a "trainable network". A belief network, otherwise known as a Bayesian network or belief net, assists statistical inferences of the probability of the occurrence of an event or state given knowledge about one or more other events or states. This probability of occurrence is known to statisticians as a "marginal probability" when calculated summing exhaustively over possibilities for other events or states and a "contingent probability" when calculated after selection of limited possibilities for other events or states, and both are described herein as a "local probability". A neural network of appropriate structure (e.g., back-propagation network) also assists statistical inferences but these are not explicitly localized within the network, although systematic changes observed within such a network may still be interpreted in terms of probability relationships. Both kinds of network are depicted in terms of an acyclic graph of nodes (vertices) connected by links (edges) in which each node stands for a variable of interest and each link is used to propagate changes in value from one node to the next, combined in a way that is determined by properties of the receiving node. In a belief net, each link stands for a statistical relationship between the pair of variables at the nodes which it joins, which may include a causal influence from antecedent node (e.g., X) to descendant node (e.g., Y), expressed here as X→Y. If two nodes X and Y have no direct path between them (they are 'disconnected'), there is no direct statistical relationship between the variables, although there may be indirect (but conditionally independent) relationships as a result of links to common nodes, (e.g., Z→X and Z→Y). In any probabilistic network used within this invention, for each variable, possible states are defined, which for a continuous variable are discrete sample intervals chosen to provide a balance between accuracy and speed for computation. From a functional relationship based on scientific theories, scientific findings or expert judgment, the conditional probability relationship between directly connected nodes is expressed, for each combination of states of direct antecedents, as a tabulation of probabilities over all states of the descendent node. The overall or joint probability distribution function that relates all the states of all the variables is then uniquely defined. Probabilistic networks are useful to provide a convenient means for expressing assumptions about statistical relationships; they facilitate economical representation of joint probability functions, and facilitate efficient inferences from observations. The existing state of the art allows, where the network is a trainable network, the most likely probabilistic network to be estimated through a training process using sets of empirical observations even where there are unobserved variables (called "hidden nodes"), so that belief nets are trainable networks. See Causality: Models, Reasoning and Inference, Judea Pearl, Cambridge University Press, 2000.

The term "reliability," as used herein with respect to a measurement method or calculation is the extent to which that method or calculation correctly predicts outcomes that can be independently measured.

As used herein, "research options" are the subject matter for choices on content for R&D, including targets, assays, compounds, lead series, chemical features, and compounds that have survived previous selection decisions (e.g., leads, development candidates, product candidate). The product is a research option that finally passes all hurdles in development. Such research options exclude the therapy area within which research is being conducted, which acts as a context for the research, and also exclude the choice of conduct of research (such as the sequencing of tasks, the method of choice of research options, and the specific criteria used for selection of research options (see definition of criterion), and the levels of thresholds applied to criteria), with the exception that an assay is included as a research option in the circumstances where assays may be selected by applying measures of assay quality (e.g., false positive fraction, false negative fraction) as criteria. Elsewhere in a different or even the same research model, an assay may be (additionally) represented as a node (variable) in a probabilistic network providing one or more criteria through which the quality of other research options may be estimated.

As used herein, the term "resource" is something needed for a task to be performed, for example, equipment, personnel or materials (e.g., a compound for screening).

As used herein, the term "risk" in the context of an R&D process is expressed as a distribution over possible outcomes of R&D projects. If an economic measure is applied to each of these outcomes, standard statistical measures (e.g., standard deviation) are used to assess "economic risk." This distribution can be modeled through analysis of the sequence of stages and the chance of passing each stage. This chance can be decomposed into the chance of progression of individual compounds (compound attrition) and the chance of the project failing for other reasons, "independent attrition", which may be due to problems associated with correctly understanding the biology of the disease and target, or associated with commercial difficulties (e.g., a competitor's patent covers the chemical family being tested).

"Selection", as used herein, is a process of choice amongst research options, possibly including more than one measure, including the definition of a range on a continuous scale in one or more variables, for selection amongst an infinite number of research options. It can mean either a final decision to progress some research options and reject others, or a prioritization decision between research options. It can also mean a decision to process different research options in different ways, for example applying different subsequent criteria. Selection can also take place in two or more successive steps of application of criteria where research options are marked in the first step as having provisional properties and then in the second selection step, further criteria are applied and the results are combined to determine which research options are preferred overall. Selection may also be applied in the form of a ranking where preferred research options are progressed first in sequence and, according to subsequent findings for such options, further research options are considered as needed until the project or stage succeeds or is abandoned or restarted.

A "site," as used herein, is a location of work where tasks of the same kind are likely to share resources. A single site could be distributed over a geographical region if test samples or resources (typically people) are considered to be mobile.

A "stage" of research and development, as used herein, consists of the activities required in order to move a drug target, assay, compound, lead series, lead or development candidate, or other such options within biotechnology industry, from consideration to selection. The R&D stages are generally sequential for a given project but may overlap in time and, in some instances, require repetition prior to progressing to the next stage. More particularly, once a stage of work has completed, either there are enough successful outcomes to start the next stage in sequence, or it may be necessary to recycle and return to the start of the same, or an even earlier stage, with a new family of compounds for test, with new or improved assays, or even with a new biological target for investigation. Different stages of different projects will typically be performed at the same time, such that specialized resources are used efficiently and without long idle periods.

As used herein, a "task" is used interchangeably with "activity" to mean a unit of work, for example the application of a test to a compound or batch of compounds.

As used herein, the term "test" refers to a research method often performed with automated equipment, or used to describe a computational procedure such as the calculation of chemical properties, in either case, for the purpose of guiding selection of a research option or options. When applied to a set of compounds, a test yields a "test result" for each compound As used herein, a "therapy area" or "therapeutic area," is an organizational unit of an R&D group in which one or more biological targets for intervention in the disease process are being considered. Typically a therapy area is focused on the treatment of a number of diseases which are commonly related based either on the part of the body which they affect (e.g., the central nervous system), on the type of disease agent they involve (e.g., antibacterial), or on the type of disease process they involve (e.g., anti-inflammatory). A therapy area typically includes several projects considering multiple modes of action of drugs on targets and/or the potential spread of disease treatments available through a single mode of action (a mode of action is the way in which the drug interacts within the patient with large molecules such as proteins to create a useful therapeutic effect).

As used herein, a "threshold level" for a test is the numerical cutoff value (for continuous variables) or (for categorical variables) the category boundary between passing and failing compounds during screening or, more generally, between passing and failing research options (e.g., potential biological targets for research or, where the research stage is choosing an assay for use with the target, assays suitable for use). In some tests, both high and low values indicate poor (or, conceivably, good) quality, requiring the use of two threshold values defining an intermediate range there between. For a binary result (categories are "true"/"false"), there are three threshold levels and four possible applications of these: pass all research options, pass none of the research options, pass on a "true" result, or pass on a "false" result.

The term "value" as used herein with respect to a research option means the expected present value, the risk-adjusted and discounted stream of future post-tax earnings. "Net value" is the gross value less the costs incurred.

As used herein, "work" is the application of one or more resources to effect completion of one or more tasks.

A "computer-based system" or "computer system" refers to the hardware means, software means, and data storage means used to analyze the information of the present invention. The minimum hardware of the computer-based systems of the present invention comprises a central processing unit (CPU), input means, output means, and data storage means. The computer systems may further include a display means and user interface means (e.g., keyboard). A skilled artisan can readily appreciate that any one of the currently available computer-based system are suitable for use in the present invention. The data storage means may comprise any manufacture comprising a recording of the present information as described above, or a memory access means that can access such a manufacture.

A "processor" references any hardware and/or software combination which will perform the functions required of it. For example, any processor herein may be a programmable digital microprocessor such as available in the form of an electronic controller, mainframe, server or personal computer (desktop or portable). Where the processor is programmable, suitable programming can be communicated from a remote location to the processor, or previously saved in a computer program product (such as a portable or fixed computer readable storage medium, whether magnetic, optical or solid state device based). For example, a magnetic medium or optical disk may carry the programming, and can be read by a suitable reader communicating with each processor at its corresponding station.

DETAILED DESCRIPTION OF THE PREFERRED EMBODIMENTS

Before the present invention is described, it is to be understood that this invention is not limited to specific method steps described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a drug" may include a plurality of drugs and reference to "the step" may include reference to one or more steps and equivalents thereof known to those skilled in the art, and so forth. Further, the term, "a set" includes a set containing only one item.

The publications discussed herein are provided solely for their disclosure prior to the filing date of the present application. Nothing herein is to be construed as an admission that the present invention is not entitled to antedate such publication by virtue of prior invention. Further, the dates of publication provided might be different from the actual publication dates which may need to be independently confirmed.

The present invention provides new methods of doing business and systems for implementing those methods whereby a technology, biotechnology, pharmaceutical or genomics organization or the like is assisted in making choices and decisions about its prospective products and the research and development thereof in order to realize the greatest economic gain from commercialization of the products.

An important aspect of the invention is the consideration of both scientific and business-related factors and the cause and effect between them in making decisions and choices at the various stages in the research and development process. The invention provides a way of modelling and facilitating a continuously reiterative, closed loop process by which the various decision makers can redefine each task as needed at each stage of the research and development process based on the information gleaned from implementation of the subject methods, from the R&D process itself and from wider industry or public domain information as it becomes available.

FIG. 1 provides a chart that illustrates this reiterative aspect of the present invention in the context of some of the tasks to be accomplished by the various roles within the overall R&D process. Generally, there is a hierarchy of these tasks which first involves defining the decision making process, i.e., deciding which tests to perform and the threshold levels for each test, and then applying the decision-making process to a selection of specific research options for progression (e.g., targets, series, compounds, etc.). For purposes of describing the invention, the various high-level tasks have been categorized as relating to (1) setting goals and analyzing risks and tradeoffs; (2) planning and executing the R&D process; and (3) reviewing outcomes and making new plans to improve the process based on those outcomes; however, such categorization is intended to be exemplary and it is recognized that other types of decisions and tasks exist and are not intended to be excluded herein.

Each of these types of tasks are made or performed either across the whole R&D process or for a segment of the process, comprising one or more sequential stages. Where these stages exclude the final launch and sales of a product, then the outcomes from these stages are valued by taking into account the range of potential outcomes, including the costs and likelihood of success of all the R&D stages that remain to be performed before the product launches.

The potential users of the present invention have been loosely characterized within three broad roles, performing "strategic planning," "process implementation," and "technology evaluation and change initiatives;" however, such categorization is intended to be exemplary and it is recognized that other roles may exist in a particular R&D organization, and that roles may be shared by individuals or teams. In particular, implementation of a research process may be delegated to the project manager or project team with discretion to perform the decisions and tasks described.

The arrows on the left-hand border of the chart of FIG. 1 indicate the reiterative or learning aspect of the present invention. More specifically, based on a review and analysis of the outcomes (task type 3, which includes specific tasks (c), (f) and (i)) in the different user roles), the goal setting and risk analysis (task type 1, which includes specific tasks (a), (d) and (g)) and the planning and execution of the process (task type 2, which includes specific tasks (b), (e) and (h)) to achieve the set goals are adjusted or recalibrated in order to optimize the next set of outcomes. This learning loop is now described for each of the strategic planning, process implementation, and technology evaluation/research improvement roles.

Strategic Planning

Task (a), i.e., the setting of goals and the analysis of risks and tradeoff within the strategic planning of R&D, involves assessing the risks and tradeoffs between the quality and the quantity of anticipated research output, to set success measures that are likely to apply to more than one research project. Such output consists, for any stage, of the research options put forward for further development or selection in the following stage, culminating in adding value at the end of R&D via product registration, or possibly at an intermediate stage via licensing intellectual property to another organization. This decision/task requires knowledge of industry-wide and company-specific data and may involve the use of conventional statistical, financial and management science methodologies, such as multiple regression, or factor analysis, decision tree analysis, time discounting, and calculation of a risk premium on the cost of capital based on any undiversified risks.

Task (b), i.e., the planning and execution of the best process to meet the goals identified in (a), involves identifying potential bottlenecks in the R&D process and allocating resources to the investigation or development of particular products, and the compounds or series that may be developable into each product, at the cost of the attrition of other products or potential products. It is necessary to decide how steep a cut to make amongst the available research options at each stage, in such a way as to avoid overloading the expected capacity. These decisions/tasks may be facilitated based on the use of steady-state modeling and by the iterative calculation of capacity loading as a result of changes to the standard sequence of the research process that would, without new evidence, be applied to all new projects.

Task (c), i.e., the review of outcomes of previous tests in one or more projects, preparatory to the identification and then implementation of improvements to the R&D process in view of those outcomes, involves reviewing the successes and failures of previous company and possibly wider industry projects, and identifying the causes of each so that success can be repeated and failures can be avoided moving forward, within the strategic planning role by adjusting the goals, cross-project priorities, and total resources available for work. This task may be facilitated based on at least the use of probabilistic networks to learn statistical correlations, and in particular, causal relationships. The information and data learned based on this decision/task is then used to further refine and calibrate decision/tasks (a) and (b).

Process Implementation

Task (d), i.e., the setting of goals and the analysis of risks and tradeoff at the process implementation stage of an R&D project, involves deciding on the scientific tests that should be employed and whether to employ them in sequence or on a parallel basis. The decision on whether to do work in parallel involves balancing the cost of utilizing many resources at once, and the resulting impact on other projects, against the advantages of faster progress on a given project and of combining or weighting multiple numerical results over the various tests before deciding which research options to progress. This form of numerical weighting, which is a standard practice for multi-attribute decision making in R&D process, allows for a better balance in quality over multiple criteria or test results A, B, C etc, as a very favorable result C can be set against slightly adverse results A and/or B. In the sequential use of tests, on the other hand, an research option may already have been eliminated on test results A or B alone and so the finding C would not be available for consideration over all the original research options. Task (d) may involve the combination of various methodologies of the present invention. For example, the conditional relationships between test results such as A, B and C, and later project outcomes, may be assimilated within a probabilistic network (e.g., Bayesian network/belief net). The capacity loading calculations are then made according to which tests are used and to the sequence of testing in a way that is iterative with the setting of thresholds, including generalized thresholds for multiple variables as defined above, so as better to understand the range of possibilities and benefits or disadvantages for parallel testing and numerically combining results.

Implementation of task (e), i.e., the planning and execution of the R&D process at the process implementation stage of an R&D project, assumes that the tests to be used and their sequence or parallel nature have already been decided in task (d). It often times involves choosing the threshold levels for the various scientific tests determined above while taking into consideration predictive reliability, the impact of false positives and false negatives, and certain other project-specific factors such as the anticipated chance of failure in subsequent testing, which if high, reduces the opportunity cost of a false negative. This task may be facilitated based on the use of modeling, notably the interactive calculation of loading on capacity on the current and subsequent stages according to the thresholds set in the current stage, using prior knowledge (such as from task (f)), stored permanently or temporarily in a belief net), about relationships between quality characteristics, to carry out the process of inference of the proportion of compounds passing or failing later R&D tests, and the change in net value of the resulting research options, related to the use of capacity and potential marginal costs of capacity additions.

Task (f), ie., the review of outcomes of running the R&D process to date, preparatory to improvements to the R&D process in view of those outcomes, involves assimilating current project findings into the prior company and industry findings from task (c), and refining the scientific and empirical bases for the R&D process, in light of the current and collective outcomes. This task may be facilitated based on at least the use of probabilistic networks. The information and data learned based on this task is then used to further refine and calibrate tasks (d) and (e) and also may contribute to the broader cross-project learning in decision/task (c).

Technology Evaluation/Change Initiative

Task (g), i.e., the setting of goals and the analysis of risks and tradeoff when considering alternatives for investment in the R&D process itself and its supporting technology (e.g., new/improved screening equipment, new expertise, or new or enhanced software for estimating molecular properties), involves considering whether changes should be made to the scientific methods employed in order to improve the process. Where the supporting technology to be considered is a predictive technology which provides better estimates for decision making, then assessment of the process is accomplished through insertion, within a belief network that represents the existing research process, of nodes and links—representing the variables to be measured or predicted and the expected reliability of prediction of the new technology—as an addition, or substituting for one or more of the existing tests. Where the technology is an automation technology which is used to improve the rate of existing work, then the potential value is estimated by setting the value of additional capacity against the marginal cost of the new technology, with the advantage that it is possible to compare this impact against alternative ways of changing research such as, instead, reducing the loading on capacity by using predictions of quality in earlier stages (known in the industry as a strategy of "early attrition").

In the context of task (g), it is important to choose the best conduct of research amongst all feasible alternatives, not just to estimate whether introducing a new technology would give an improvement relative to the current process. This task may be further facilitated by the application of economic theories, such as marginal cost formulations.

Task (h), i.e., the planning and execution of implementing a new technology or research methodology for potential use in multiple projects, takes into consideration the potential impact on bottlenecks, quality and value in a way that allows specific advice on implementation of this new approach. As with task (g), it is important to keep in mind that a particular technology may not be suitable for all projects or all therapeutic areas. For example where the expected value of the output from research in the project (the product candidate) is very high, then a predictive technology with a high fraction of false negatives may not be recommended. The subject methods provide a sensitivity analysis of net value added by a change in research process, or the use of a new technology, over parameters specific to an R&D project or therapeutic area. Within a belief net, the project portfolio is represented as a chance node where each project is a discrete state, with links to other variables that vary between projects. To select a single, individual project from the entire portfolio, the probability of that project is set at 100%. This allows an immediate comparison of the results of modelling for. that project with the results of an analysis averaged over the portfolio of all projects.

Task (i), i.e., the review of outcomes from previous investments and changes in the research process and methods, involves evaluating the robustness of the current plans for change and improvement as determined from task (g), considering sensitivity to assumptions and identifying needs for new information. Both of these tasks may be facilitated by the use of Bayesian networks. The sensitivity to assumptions is estimated by selecting a variable in the network and determining how the net value, the likelihood of success at any stage of R&D, or other variables of interest, depend on this variable. Needs for new information can be identified through standard statistical measures of confidence, provided the technology used for implementation of the belief net incorporates a record of the amount of evidence used to underpin the current set of conditional probabilities. Commonly available belief net implementations such as Netica™ from Norsys Corp, Canada and Hugin™ from Hugin Expert A/S, Denmark provide facilities to identify how conclusions would be affected by new evidence, and the existing state of the art in belief networks points to ways of planning the investigation that will best increase the confidence in the overall reliability of inference (see, e.g., Tong, S., Koller, D., Active Learning for Structure in Bayesian Networks). From implementing the belief net, it is possible to identify the weakest links in the factors considered in the proposition that a change should be made to the research process or that an investment should be made in a new technology. This kind of robustness assessment is useful to a proponent of a research improvement initiative, as well as to those charged with making recommendations with respect to the introduction of a new technology, helping them to explore alternatives systematically. It is also useful in the context of task (g) in preparing a more robust case for change or in rejecting the proposed change. The information and data learned is then used to further refine and calibrate tasks (g) and (h).

The subject methods involve the application of both value and cost modeling methodologies, where the cost may include a use of a share of fixed capacity, which results in an increase of the long-run cost of work through the need to replace that capacity. One means for value assessment involves the use of probabilistic networks such as Bayesian networks. In the context of the present invention, the Bayesian network tracks the likelihood relationships between quality characteristics, i.e., all relevant scientific or estimated commercial (e.g., innovative) properties of a research option, product or drug and the business outcomes of a resulting product. The cost assessment component may be based on the assumptions that each R&D stage through which a product is identified and selected for development, or each set of tasks within a stage if a stage is split into sequential activities, represents a continuum, and that the R&D tasks performed on each research option are homogenous across the research options within the organization, site, therapeutic area, or one or more R&D projects, according to the scope of modeling (e.g., screening one compound takes the same effort and time as screening any other compound). It may also be assumed in the first instance that the personnel, space, equipment and test subject capacities and the costs associated with each are constant over time. Alternatively a wider analysis may be performed which studies the potential impact of varying these parameters over time or varying the flow, including adjusting the rate of input to the first stage, for example assuming a linear or exponential increase in the size of the library of compounds available to be screened. In such a case the model has to take account of the average time taken for each stage of work, which is the amount of work divided by the (flow) rate of work.

Modeling a repetitive research process requires defining the flow through the R&D process at each stage. As mentioned above, the flow comprises the various research options that are being considered for selection within the R&D process. The various research options include the biological targets or compounds to be included in a real chemical library for screening or a virtual library for computational assessments, so-called "hits" which are compounds detected in a binding assay, series of structurally similar compounds, and further compounds made through enumeration of each such series in the process of lead optimization. The flow must be balanced against the process' inherent capacities and resources and is therefore adjusted as necessary within the model by the addition of tests that can select out research options, allowing for the capacity use of each such test, which will depend on its specific nature and complexity, and on any necessary preparatory work. The volume of flow is further adjusted by setting a threshold level or value for one or more test parameters including calculated and derived parameters. Such test parameters are dictated by the user, and include both technical/scientific and business measures where available. They include but are not limited to activity level, permeability, calculated likelihood of toxicity, and molecular properties found in the industry or company to have preferred ranges predictive of quality as a drug (such as molecular weight, lipophilicity, the number of hydrogen bond acceptors or donors, the polar surface area, the number of rotatable bonds, or other variables derived from molecular structure).

Combining the value and cost computations of the present invention involves the mathematical integration or summation of probabilities of occurrence of different outcomes (states) for a node in a probabilistic network. This node is representative of the probability distribution(s) of the occurrence of outcomes of test results or calculations which will be the basis for selection decisions, given the research options already chosen for a given research project within the planned research process, methods and technologies. The integration or summation is used to estimate the fraction of research options selected at each stage, and therefore the change in flow, as a result of an imposition of a criterion or a change in a threshold for such a criterion.

This calculation may include choices based on previous decisions for a given research option, i.e., a compound may not be rejected immediately but flagged as suspect and then rejected later more readily than a compound which has not been flagged. Also the calculation of work may allow for alternative tests or test sequences being applied according to previous test results.

Concurrently with estimating the fractional change in flow through rejecting research options, the probability of occurrence within the belief net is set to zero for all those values or discrete states that would be rejected at the (generalized) test threshold under assessment (where generalizing allows for the use of multiple variables in a given choice and the combination of variables into new sets). The belief net is then used to perform an inference process to estimate the quality of the outcomes at all later stages of research, and thus the resulting economic value and, if required, the risk, of the estimated product quality profile. These estimations are conditional on the suggested tests and associated threshold levels.

The flows at each stage, as modified by fractional changes, and by any independent attrition, are set against the various capacity utilization and resource requirements required to implement the research process for the given selection and sequencing of tests, and levels of thresholds. The volume of research options to be assessed at each stage, or in any parallel set of tests that may be performed separately within a stage, is compared dynamically with the available capacity to estimate the maximum feasible throughput reaching the last stage of R&D that is included within the analysis. Operating costs, which may depend on the flow (volume) of work, are taken into account. The flow from the last stage of R&D within the analysis is combined with the estimated value, cost and risk of further development using the quality distribution of the candidate product. This step of multiplying final throughput (flow of candidates as an output from the last stage) by the specific net value for each candidate, averaged over all the relevant parameters of candidate quality reported by the probabilistic network holding the preselected research criteria, gives an estimate of the rate at which the suggested research process can add value.

It is also possible using a Poisson function to derive, from the estimated flow out of a stage, optionally divided into a number of sites or a number of projects (which may give a number with a fractional part), the discrete probability distribution representing the probability in any given time period of having a given number of successes. This is an important practical metric for management but may not always lead to the same conclusions as maximizing the expected value added, in which case the availability of both predicted success counts (with distribution over such counts) and value creation predictions is advantageous.

As mentioned above, the probabilistic network is used to track the conditional probability relationships amongst scientific estimates of research option quality and between these and business estimates of candidate quality: descriptors of the product, meaningful and important to the prescribing physician, which take part in the estimation of economic value. The estimates of local and conditional probabilities may be determined by either or both empirical data and values or scores based on quantitative judgments on cause and effect. The scientific properties may be initially determined by the use of one or more predictive models, e.g., ADME model, known by those skilled in the art. The relationship between the scientific and business qualities are represented as conditional probability distributions. Marginal probability distributions may also be used to average out variables that are temporarily of less interest, a process known within belief net applications as "node absorption."

Figure 2:
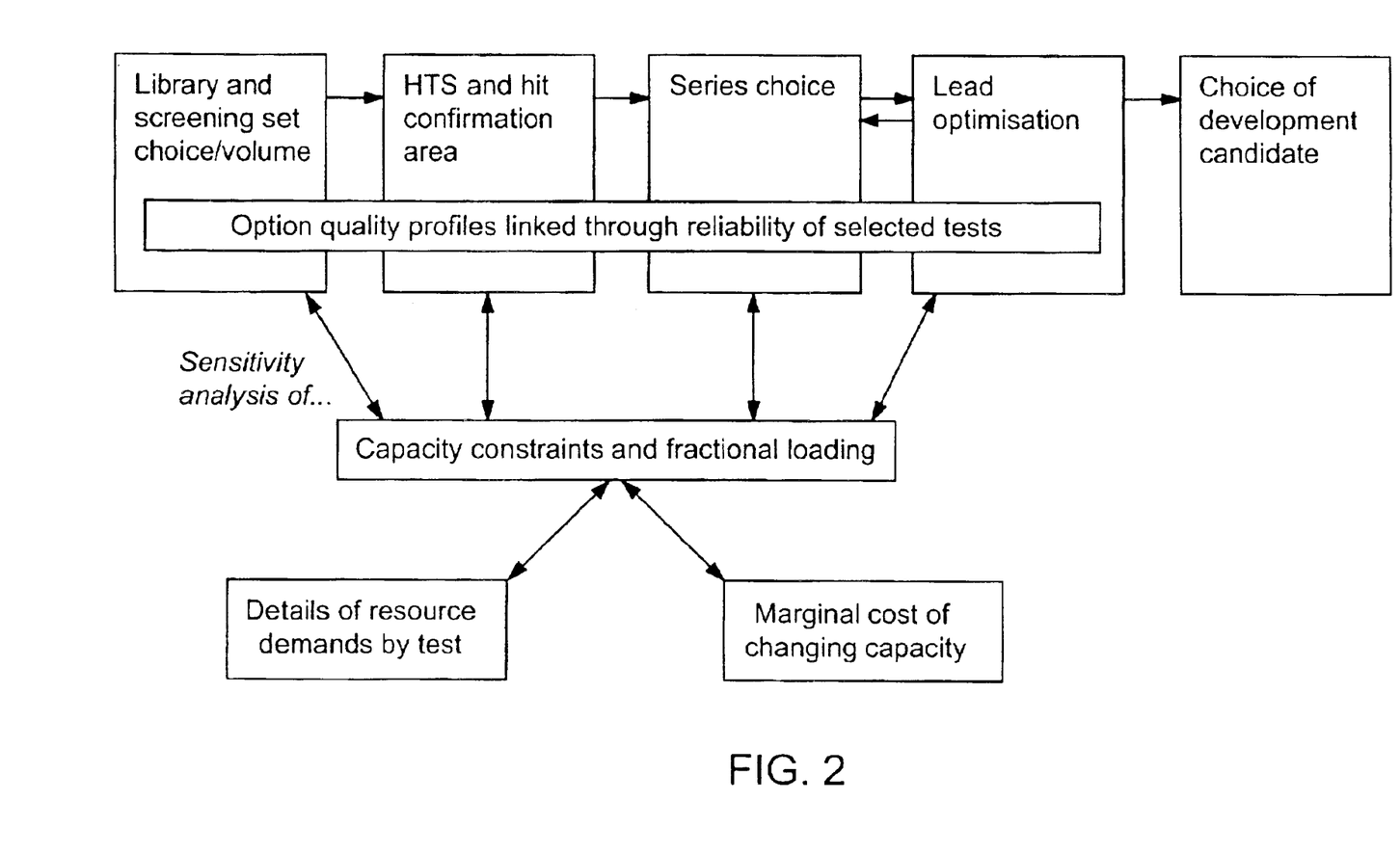
FIG. 2 is a chart illustrating typical stages of the discovery phase of a research and development project and the associated quality profile which links the research options considered in these stages with capacity and resource use.

FIG. 2 illustrates the general principles discussed above. There are typically a number of stages of research and development which culminate in the provision of a product or development candidate. In each stage, various research options are considered. In early stages the research options consist of targets and assays, and libraries of compounds to be screened in these assays (i.e., high throughput screening). As a result of this screening, hits are identified and confirmed. These hits are then clustered into various series, and from these series, through a process of "lead optimization,"

new compounds are synthesized. With a project, at any one time no more than one such compound (the "lead") may be selected as a development candidate, possibly with other "backup" compounds to follow if development of the selected compound fails.

The quality for the research options at all stages, calculated or measured as test results, has a random component but is partly predictive of factors important for final product value, with increasing reliability in later stages. The quality of a target affects the product value over all compounds that might be developed against that target. The quality of an assay has an indirect impact on project value by improving the detectability of potential drugs and also the reliability of predictions made about them. For each stage there is a capacity constraint, on which the fractional loading depends on the criteria applied, which may be detailed in terms of the resource demands of each test or calculation, or the supporting chemical synthesis. This constraint can be elevated at a marginal cost.

Various calculations may then be made to determine the effect that changes to the various test parameters, or their sequencing, have on the value added by the R&D process. For example, the value added by a change may be represented by the following equation:

$$\Delta NV=(\Delta OR \times (MV-EC))-MC-\Delta OC$$

where $\Delta NV$ is the change in the net value added in unit time by research between alternative policies to be compared, where in the case considered, the change is mainly to flow and not to quality; $\Delta OR$ is the change in output flow rate from the last stage, here assumed to create development candidates; MV is the market value over the quality profile of the development candidates; EC is the expected cost of development from candidate up to product allowing for the set quality profile; MC is, for long-term decisions such as technology investments or changes in recommended conduct of research, the cost of any change to capacity, amortized over the planned life of the investment using a cost of capital that excludes any premium for diversifiable risk, or alternatively, for short-term changes (such as individual project decisions), the marginal cost of the change as a cash sum, divided by the number of time units in the period considered; and $\Delta OC$ is the change in operating cost per unit time associated with the R&D process segment including costs pertaining to any change in input flow to the first stage of that segment, for example costs of access to additional targets or biotechnology inventions.

If the change involves both flow and quality then the equation becomes:

$$\Delta NV=(OR2 \times (MV2-EC2))-(OR1 \times (MV1-EC1))-MC-\Delta OC$$

where the suffixes 1,2 represent the values for the two alternatives before and after the change, and OR, MV and EC are again output flow rate, market value and expected cost of development as defined in more detail above.

The analysis of changes, when a test, activity or event is either included in or excluded from the research process, in conjunction with an estimate of the cost of capital, allows a user to analyze whether a test, activity or event in the R&D process is value-adding, value-diluting, value-destroying or inconsequential. By varying the threshold level for a given test as well as the use and sequence of tests in different permutations, and the possibilities for changes to the level and allocation of resources, it is possible to use standard optimization approaches, such as gradient descent, to predict the best course of action either by default, for all projects, therapeutic areas and/or all sites, or, by appropriate selection of resource needs, development candidate valuations, criteria modeled within the belief net, rates of independent attrition, and conditional probability relationships, for (a) selected project(s), therapeutic area(s) and site(s).

This optimization may be performed in up to three nested loops (i.e., the innermost loop, the middle loop and the outermost loop) according to the range of R&D methods that the user wishes to explore. The innermost loop involves the variation of thresholds in one or more tests in one or more stages, up to but not including the extreme cases where either a test is not passing any research options or is passing all research options (which cases belong in the middle loop). The middle loop involves the addition or removal of tests from a parallel set or stage of work, with corresponding changes to resource use and including, if weighted scoring is being considered, the inclusion of new possibilities for generalized thresholds within the parameters modeled in the belief network and available for use in the calculation of flow volumes. The outermost loop involves the exploration of different levels of capacity constraint, and different allocations of shared resources (such as chemists) to help change the effective capacities in more than one stage of work, or parallel set of tests within a stage; for example, moving chemists from synthesizing a large library for high-throughput screening, to making new examples of lead series in the lead optimization stage of R&D. Alternative algorithms that give similar results may be employed, as known to those versed in the art of optimization.

In one variation, the present invention provides a method of improving the effectiveness of an R&D process within an organization where that organization may include one or more sites, therapy areas and projects, and the R&D process includes a plurality of stages of selection and/or enumeration of research options and identification of one or more candidates. Each stage comprises one or more sets of parallel tasks that are optionally reiterated in a number of cycles. Each task comprises one or more subtasks, wherein a batch is a collection of the one or more subtasks. Each set of parallel tasks has an input flow and an output flow of research options, wherein, at a final stage, the research options are candidates. In particular, the method includes the following: identifying quality attributes of the candidates; defining a measure of utility over a quality profile of identified quality attributes, wherein a combination of utility and the flow of candidates quantifies improvements to the R&D process; identifying the types of research options for each of the plurality of stages; identifying criteria relevant for use in selecting and/or enumerating amongst research options of each identified type; identifying causal relationships amongst the criteria and between the criteria and the quality attributes; forming a probabilistic network representing the causal relationships as links holding conditional probabilities and representing the criteria and quality attributes as nodes, each node having a plurality of states permitting an ordering amongst the research options consistent with thresholds applicable for selecting and/or enumerating the research options, and each node holding a probability distribution over the plurality of states; estimating an effective capacity for each stage; setting local probabilities at nodes that represent prior knowledge of the research options and the R&D process; identifying alternatives for operating the R&D process; intervening in the probabilistic network to change the probabilities of the states to represent differences between the alternatives wherein the differences comprise at least one of (i) the criteria to be applied, (ii) the stage in which a criterion is applied, and (iii)

the threshold at which a criterion is applied; and evaluating the degree of improvement by calculating (i) the quality profile of the candidates, (ii) the change in an average of the utility for each candidate, and (iii) the output flow of the candidates, limited at the final stage and also at each previous stage by the input flow to that stage relative to the effective capacity. Various steps of the method may be reiterated as needed to optimize the outcomes. In particular, the steps of setting local probabilities through to evaluating the degree of improvements, and the steps in between, may be reiterated as needed.

Within the context of the above-described method variation, utility is a measure of gross economic value where the net economic value is the gross economic value less operating costs estimated from at least the input flow into at least one stage of the R&D process. Further, the effective capacity is considered to have a cost associated with it where that cost is a capital cost As such, the method may include the additional step of comparing the net economic value with the cost of the effective capacity.

In one variation of the above-described method, the method further includes changing the effective capacity for at least one stage, wherein the cost of the change in the effective capacity is a marginal cost. The change to the net economic value may then be compared with the marginal cost. As such, the improvements may be identified using an automated process of optimization using as a goal the utility combined with flow of candidates and the marginal cost.

At least one additional node may be added to the probabilistic network wherein a state of the at least one additional node represents a project or a therapy area. The links from the at least one additional node are used to represent systematic differences in criteria between projects or between therapeutic areas. A plurality of states of the at least one additional node may be selected wherein the improvements the R&D process are evaluated over at least a portion of the R&D organization. The effectiveness of a research process may be represented in terms of a discrete number of candidates in unit time using a Poisson function applied to an average flow of candidates. Still yet, the additional node may be a hidden node, as described above, or otherwise represent a combination of two or more criteria.

In another variation of the method, the effective capacity may be calculated based on the available resources, wherein the available resources are movable between stages of the R&D process. As each of the stages includes one or more sets of parallel tasks, estimating the effective capacity involves calculations based on the available resources wherein each available resource is either limited to use within a stage, a set of tasks or an individual task or is shared between a plurality of tasks.

The conditional and local probabilities used within the method may be obtained through a training process, using a trainable network as the probabilistic network.

Calculation of the output flow of the candidates involves cumulating ratios of the output flow to the input flow for the sets of parallel tasks. Each ratio may be calculated in one of two ways depending on the nature of the probabilistic network. For a network with ordered discrete states, the ratios are calculated by summing over local probabilities. For networks in which the nodes take continuous values, the ratios are calculated by integrating over the local probabilities. One or more pairs of thresholds may be used to select research options where each pair defines a range.

Calculation of the output flow may further include cumulating flow ratios using one or more of the group consisting of independent attrition, conversion factors, the number of cycles and the batch size. With such calculation of output flow, the method may further involve creating one or more additional nodes in the probabilistic network representing the number of cycles or batch size with one or more additional links, wherein each link influences quality attributes, wherein the value of the one or more additional nodes is used in calculating the flow ratios.

The method may further be used to identify the improvements using an automated process of optimization using as a goal the utility combined with flow of candidates. The improvements may also be evaluated using a measure of risk calculated over the probability distributions represented by the nodes representing quality attributes of the candidates.

In the context of the inventive method, the probabilistic network may also be used to conduct a sensitivity and risk analysis of proposals for investment in research technology.

The method can be adjusted to provide any appropriate outcome, and display that outcome or outcomes, such as for example, chemical and biological data in conjunction with decision boundaries for criteria.

The net value of the various outcomes derived from the subject methods, taking account of end values through a belief network and of capacity loading, could be combined to help management and scientists determine the best weighting of the various criteria for decision making involving multiple attributes where the attributes are numerically combined into new variables, and decide whether certain tasks and/or test should be performed in parallel or in series and if so, at what threshold levels for one or more of the combined variables.

The subject methods may further include means for factoring in errors and uncertainties in the scientific experimentation and computational chemical and biological predictions that are made concerning the product, estimated from examples of data. One way in which this can be accomplished is by incorporating a non-informative prior distribution, for example, as described in "A catalog of noninformative priors", Yang and Berger (1998) (see http://www.isds.duke.edu/~berger/papers/catalog.html).

The present invention further includes systems for improving the effectiveness of a R&D process within an organization as described above. In one variation, an inventive system includes the following: means for identifying quality attributes of the candidates; means for defining a measure of utility over a quality profile of identified quality attributes, wherein a combination of utility and the flow of candidates quantifies improvements to the R&D process; means for identifying the types of research options for each of the plurality of stages; means for identifying criteria relevant for use in selecting and/or enumerating amongst research options of each identified type; means for identifying causal relationships amongst the criteria and between the criteria and the quality attributes; means for forming a probabilistic network representing the causal relationships as links holding conditional probabilities and representing the criteria and quality attributes as nodes, each node having a plurality of states permitting an ordering amongst the research options consistent with thresholds applicable for selecting and/or enumerating the research options, and each node holding a probability distribution over the plurality of states; means for estimating an effective capacity for each stage; means for setting local probabilities at nodes that represent prior knowledge of the research options and the R&D process; means for identifying alternatives for operating the R&D process; means for intervening in the probabilistic network to change the probabilities of the states to represent differences between the alternatives wherein the differences comprise at least one of (i) the criteria to be applied, (ii) the stage in which a criterion is applied, and (iii) the threshold at which a criterion is applied; and means for evaluating the degree of improvement by calculating (i) the quality profile of the candidates, (ii) the change in an average value of the utility for each candidate, and (iii) the output flow of the candidates, limited at each stage by the input flow relative to the effective capacity.

The system may further include means for visually displaying the various outcomes derived from the subject methods. Examples of the outcomes that may displayed include but are not limited to the loading on capacity in response to user selection of criteria and thresholds, the probabilities of states, preferably in the form of a cumulative display of the probabilities of states within which thresholds are displayed as boundaries between states. The states distinguished by such thresholds may be modified by "clicking and dragging" threshold positions, or by clicking on the intended new threshold position. Other outcomes which may be displayed include the discrete probability distributions which may be portrayed as bars and net values, which may be illustrated in the form of bar charts. Other visual cues, such as change of color of a bar, may be used, for example, where a change leads to a flow at any stage exceeding capacity. The currently preferred range for each criterion may be highlighted, and the numeric values bounding this range may be displayed. Other data that may be displayed includes the name of a state where the selection preference is for a state. Still yet, information on the states may be fed back to the user in the form of an optional display such as a tool-tip.

The subject systems may further utilize display prompts to prompt the user to select a criterion having a range that includes, optionally, no states or all states. The user response may be reflected by a change in display such as graying out of the visual representation of the criterion. The user may also be given the option of disabling the use of such a particular criterion within the calculation of capacity loading.

Input displays that assist the user to make selection between alternatives may include pick lists to select potential criteria from a wider list of possible criteria for which knowledge is available within a probability network. The location on the display of those criteria that are to be applied in parallel may be within a spatial arrangement such as a stack that implies contiguity. Such stacks representing sets of parallel tasks within a stage may be arranged within boundaries or within other visual devices to represent containment. Preferred relationships between criteria that, a priori, will show a high level of correlation may be shown in the form of families, optionally named (such as "activity"), and such families may be arranged with a visible relationship between tasks, such as a row or column. In one particular embodiment of the subject system, a decision boundary is visually overlaid on a display of specific research options using the values of the measures for those options to determine position of representation of the options on the display in such a way that options for which a choice is indifferent will be displayed in the vicinity of the decision boundary. The position of the decision boundary may be guided or determined by a process of optimization over different means for research conduct using the estimates of utility and of economic value described previously, The systems of the present invention include a computer readable medium carrying one or more software programs each having one or more sequences of instructions for carrying out one or more of the method steps of the present invention. The software program may include means for receiving one or more sequences of instructions from a user of a computer system for initiating operation of such software program and for providing various parameters for performing the method steps. The subject systems further include a processor for storing the one or more software programs, means for executing the software programs and means for storing the data generated from execution of the software programs.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of improving the effectiveness of a research and development (R&D) process within an organization comprising one or more sites, research areas and projects, the process comprising a plurality of stages of selection and/or enumeration of research options, wherein each stage comprises work comprising one or more sets of parallel tasks which are optionally reiterated in a number of cycles, wherein each task comprises one or more subtasks, wherein a batch is a collection of the one or more subtasks, wherein each set of parallel tasks has an input flow and an output flow of research options, wherein, at a final stage, the research options are candidates, the method comprising the steps of:

a. identifying quality attributes of the candidates;
  b. defining a measure of utility over a quality profile of identified quality attributes, wherein a combination of utility and the flow of candidates quantifies improvements to the R&D process;
  c. identifying the types of research options for each of the plurality of stages;
  d. identifying criteria relevant for use in selecting and/or enumerating amongst research options of each identified type;
  e. identifying causal relationships amongst the criteria and between the criteria and the quality attributes;
  f. forming a probabilistic network representing the causal relationships as links holding conditional probabilities and representing the criteria and quality attributes as nodes, each node having a plurality of states permitting an ordering amongst the research options consistent with thresholds applicable for selecting and/or enumerating the research options, and each node holding a probability distribution over the plurality of states;
  g. estimating an effective capacity for each stage;
  h. setting local probabilities at nodes that represent prior knowledge of the research options and the R&D process;
  i. identifying alternatives for operating the R&D process;
  j. intervening in the probabilistic network to change the probabilities of the states to represent differences between the alternatives wherein the differences comprise at least one of (i) the criteria to be applied, (ii) the stage in which a criterion is applied, and (iii) the threshold at which a criterion is applied; and
  k. evaluating the degree of improvement by calculating (i) the quality profile of the candidates, (ii) the change in an average value of the utility for each candidate, and (iii) the output flow of the candidates, limited by the input flow of research options relative to the effective capacity at each stage.

2. The method of claim 1, wherein the utility is a measure of gross economic value.

3. The method of claim 2, wherein a net economic value is the gross economic value less operating costs estimated from at least the input flow into at least one stage.

4. The method of claim 1, wherein the effective capacity has a cost.

5. The method of claim 4, wherein the cost is a marginal cost.

6. The method of claim 3, wherein the effective capacity has a cost and further comprising comparing the net economic value with the cost of the effective capacity.

7. The method of claim 1, further comprising the step of changing the effective capacity for at least one stage.

8. The method of claim 7, wherein the cost of the change in the effective capacity is a marginal cost and the method further comprising the step of comparing the change in net economic value with the marginal cost.

9. The method of claim 1, further comprising the step of adding at least one node to the probabilistic network.

10. The method of claim 9, wherein a state of the at least one additional node represents a project or a research area.

11. The method of claim 10, wherein the links from the at least one additional node are used to represent systematic differences in criteria between projects or between therapeutic areas.

12. The method of claim 10, further comprising the step of selecting a plurality of states of the at least one additional node wherein the improvements are evaluated over at least a portion of the R&D organization.

13. The method of claim 1 or 12 further comprising the step of representing the effectiveness of a research process in terms of a discrete number of candidates in unit time using a Poisson function applied to an average flow of candidates.

14. The method of claim 1, further comprising calculating the effective capacity based on available resources.

15. The method of claim 14, wherein the available resources are movable between stages.

16. The method of claim 1, wherein each of the stages comprises one or more sets of parallel tasks, and wherein the step of estimating the effective capacity comprises calculations based on available resources wherein each available resource is limited to use within a stage, set or task.

17. The method of claim 1, wherein each of the stages comprises one or more sets of parallel tasks, the method further comprising the step of calculating the effective capacity based on the available resources wherein each available resource is shared between a plurality of tasks.

18. The method of claim 1, further comprising adding at least one node to the probabilistic network, wherein the at least one additional node is a hidden node.

19. The method of claim 1, wherein at least one node represents a combination of two or more criteria.

20. The method of claim 1, where the probabilistic network is a trainable network, further comprising the step of obtaining the conditional and local probabilities through a training process.

21. The method of claim 1, farther comprising evaluating the improvements using a measure of risk calculated over the probability distributions represented by the nodes representing quality attributes of the candidates.

22. The method of claim 1, wherein calculating the output flow of the candidates comprises cumulating ratios of the output flow to the input flow for the sets of parallel tasks and including the conversion factors between differing research options at different stages.

23. The method of claim 22, wherein the probabilistic network comprises ordered discrete states, and each ratio is calculated by summing over local probabilities.

24. The method of claim 22, wherein the probabilistic network comprises nodes which take continuous values, and wherein each ratio is calculated by integrating over local probabilities.

25. The method of claim 22, wherein calculating the output flow further comprises cumulating flow ratios using one or more of the group consisting of independent attrition, unit changes, the number of cycles and the batch size.

26. The method of claim 25, further comprising the step of creating one or more additional nodes in the probabilistic network representing the number of cycles or batch size with one or more additional links, wherein each link influences quality attributes, wherein the value of the one or more additional nodes is used in calculating the flow ratios.

27. The method of claim 1, further comprising identifying and comparing the possible improvements using an automated process of optimization using as a goal the utility combined with flow of candidates.

28. The method of claim 1, further comprising the step of using the probabilistic network to conduct a sensitivity and risk analysis of proposals for investment in research technology.

29. The method of claim 1, further comprising the step of displaying chemical and biological data in conjunction with decision boundaries for criteria.

30. The method of claim 8, further comprising identifying and comparing the possible improvements using an automated process of optimization using as a goal the utility combined with flow of candidates and the marginal cost.

31. The method of claim 1, further comprising reiterating steps h through k.

32. The method of claim 1, wherein the thresholds comprise one or more pairs of thresholds, wherein each threshold pair defines a range for selecting the research options, the method further comprising using the threshold pairs to select research options.

33. The method of claim 1, further comprising comparing the flow through a parallel set of tasks to the amount of work required for one or more tasks within a project and using the flow to estimate the time required to complete the set.

34. A system for improving the effectiveness of a research and development (R&D) process within an organization comprising one or more sites, research areas and projects, the process comprising a plurality of stages of selection and/or enumeration of research options, wherein each stage comprises work comprising one or more sets of tasks which are optionally reiterated in a number of cycles, wherein each task comprises one or more subtasks, wherein a batch is a collection of the one or more subtasks, wherein each set of parallel tasks has an input flow and an output flow of research options, wherein, at a final stage, the research options are candidates, the system comprising:

a. means for identifying quality attributes of the candidates;

b. means for defining a measure of utility over a quality profile of identified quality attributes, wherein a combination of utility and the flow of candidates quantifies improvements to the R&D process;

c. means for identifying the types of research options for each of the plurality of stages;

d. means for identifying criteria relevant for use in selecting and/or enumerating amongst research options of each identified type;

e. means for identifying causal relationships amongst the criteria and between the criteria and the quality attributes;
f. means for forming a probabilistic network representing the causal relationships as links holding conditional probabilities and representing the criteria and quality attributes as nodes, each node having a plurality of states permitting an ordering amongst the research options consistent with thresholds applicable for selecting and/or enumerating the research options, and each node holding a probability distribution over the plurality of states;
g. means for estimating an effective capacity for each stage;
h. means for setting local probabilities at nodes that represent prior knowledge of the research options and the R&D process;
i. means for identifying alternatives for operating the R&D process;
j. means for intervening in the probabilistic network to change the probabilities of the states to represent differences between the alternatives wherein the differences comprise at least one of (i) the criteria to be applied, (ii) the stage in which a criterion is applied, and (iii) the threshold at which a criterion is applied; and
k. means for evaluating the degree of improvements by calculating (i) the quality profile of the candidates, (ii) the change in an average value of the utility for each candidate, and (iii) the output flow of the candidates, limited at each stage by the input flow relative to the effective capacity.

35. A computer readable medium carrying one or more sequences of instructions from a user of a computer system for improving the effectiveness of a research and development (R&D) process within an organization comprising one or more sites, research areas and projects, the process comprising a plurality of stages of selection and/or enumeration of research options, wherein each stage comprises work comprising one or more sets of tasks which are optionally reiterated in a number of cycles, wherein each task comprises one or more subtasks, wherein a batch is a collection of the one or more subtasks, wherein each set of parallel tasks has an input flow and an output flow of research options, wherein, at a final stage, the research options are candidates, wherein the execution of the one or more sequences of instructions by one or more processors causes the one or more processors to perform the steps of:

a. identifying quality attributes of the candidates;
b. defining a measure of utility over a quality profile of identified quality attributes, wherein a combination of utility and the flow of candidates quantifies improvements to the R&D process;
c. identifying the types of research options for each of the plurality of stages;
d. identifying criteria relevant for use in selecting and/or enumerating amongst research options of each identified type;
e. identifying causal relationships amongst the criteria and between the criteria and the quality attributes;
f. forming a probabilistic network representing the causal relationships as links holding conditional probabilities and representing the criteria and quality attributes as nodes, each node having a plurality of states permitting an ordering amongst the research options consistent with thresholds applicable for selecting and/or enumerating the research options, and each node holding a probability distribution over the plurality of states;
g. estimating an effective capacity for each stage;
h. setting local probabilities at nodes that represent prior knowledge of the research options and the R&D process;
i. identifying alternatives for operating the R&D process;
j. intervening in the probabilistic network to change the probabilities of the states to represent differences between the alternatives wherein the differences comprise at least one of (i) the criteria to be applied, (ii) the stage in which a criterion is applied, and (iii) the threshold at which a criterion is applied; and
k. evaluating the degree of improvements by calculating (i) the quality profile of the candidates, (ii) the change in an average value of the utility for each candidate, and (iii) the output flow of the candidates, limited at each stage by the input flow relative to the effective capacity.

* * * * *